(12) United States Patent
Ohtake et al.

(10) Patent No.: US 12,370,935 B2
(45) Date of Patent: Jul. 29, 2025

(54) VEHICLE FLOOR STRUCTURE

(71) Applicant: TOYOTA JIDOSHA KABUSHIKI KAISHA, Toyota (JP)

(72) Inventors: Kazuki Ohtake, Toyota (JP); Norimasa Koreishi, Miyoshi (JP); Hideo Takeda, Hekinan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 430 days.

(21) Appl. No.: 18/108,701

(22) Filed: Feb. 13, 2023

(65) Prior Publication Data

US 2023/0256884 A1    Aug. 17, 2023

(30) Foreign Application Priority Data

Feb. 16, 2022  (JP) ................. 2022-021761

(51) Int. Cl.
*B60P 1/43*    (2006.01)
*B62D 21/03*   (2006.01)
*B62D 25/20*   (2006.01)

(52) U.S. Cl.
CPC ............. *B60P 1/431* (2013.01); *B62D 21/03* (2013.01); *B62D 25/20* (2013.01)

(58) Field of Classification Search
CPC ....... B60P 1/431; B62D 21/03; B62D 25/025; B62D 25/20; B62D 25/2036
See application file for complete search history.

(56) References Cited

U.S. PATENT DOCUMENTS

| 2010/0244497 | A1  | 9/2010  | Honda et al. |
| 2018/0134318 | A1  | 5/2018  | Hata |
| 2018/0370577 | A1* | 12/2018 | Takahashi ............... B60K 1/04 |
| 2019/0047628 | A1* | 2/2019  | Kawase ............ B62D 25/2036 |
| 2020/0406974 | A1  | 12/2020 | Kaisha |
| 2021/0362785 | A1  | 11/2021 | Kaisha |

FOREIGN PATENT DOCUMENTS

| JP | S60-176976 U  | 11/1985 |
| JP | 2010-235014 A | 10/2010 |
| JP | 2018-079771 A | 5/2018 |
| JP | 2021-008165 A | 1/2021 |

* cited by examiner

*Primary Examiner* — Lori Lyjak
(74) *Attorney, Agent, or Firm* — Dinsmore & Shohl LLP (57) ABSTRACT

The vehicle floor structure includes a left rocker disposed on a side surface of the vehicle, a front floor cross member having a hat-shaped cross section composed of the upper open groove portion and the rear upper flange and the front upper flange, and a front connecting member for connecting the left rocker and the front floor cross member. The left rocker is arranged so that the height of the upper surface is lower than the rear upper flange and the front upper flange of the front floor cross member. Front connecting member has a hat-shaped cross section composed of a lower open groove portion and a rear lower flange, a front lower flange. The front connecting member connects the upper surface of the left rocker, the upper rear flange of the front floor cross member, and the upper front flange.

9 Claims, 6 Drawing Sheets

SECTION A-A

VEHICLE FLOOR STRUCTURE

CROSS REFERENCE TO RELATED APPLICATION

This application claims priority to Japanese Patent Application No. 2022-021761 filed on Feb. 16, 2022, which is incorporated herein by reference in its entirety including the specification, claims, drawings, and abstract.

TECHNICAL FIELD

The present disclosure relates to a floor structure of a vehicle composed of a rocker, a floor cross member and a connecting member.

BACKGROUND

Vehicles equipped with slope device have been used in recent years. For example, JP2021-8165A discloses a construction in which a portion of the upper surface of the side member disposed on the side of the vehicle is cut down so as to insert and remove slope plate through the upper space of the notch portion. In this configuration, a cross member that connects the left and right side members to lateral direction of the vehicle is connected to the lower side of the side member. Then, slope device is located on the upper side of the cross member.

SUMMARY

Incidentally, in recent years, there is a demand for low-floor vehicles with slopes. In the construction described in JP2021-8165A, it was difficult to lower the height of the side member because the cross member is located on the lower side of the side member, and there was a limit to lowering the floor.

Accordingly, the present disclosure is intended to lower the floor height of a vehicle with a slope device.

The vehicle floor structure of the present disclosure comprises: a rectangular closed cross-sectional rocker disposed on a side surface of the vehicle and extending to longitudinal direction of the vehicle; a floor cross member extending to lateral direction of the vehicle and having a hat-shaped cross section comprising an upper open groove and a pair of upper flanges; and a connecting member connecting the rocker and the floor cross member, wherein the rocker is arranged such that a height of the upper surface is positioned lower than the pair of upper flanges of the floor cross member, and wherein the connecting member has a hat-shaped cross section comprising a lower open groove and a pair of lower flanges, and connects the upper surface of the rocker and the pair of upper flanges of the floor cross member.

With this configuration, when the position of the upper surface of the rocker is lower than the pair of upper flanges of the floor cross member, a force can be applied to the rocker from the pair of upper flanges by connecting the pair of upper flanges of the floor cross member and the upper surface of the rocker by the connecting member. This makes it possible to increase connecting force between the floor cross member and the rocker. Then, it is possible to lower the floor height of the vehicle by lowering the position of the locker.

In the vehicle floor structure of the present disclosure, it may include a brace member connecting the side surface of the rocker and the lower surface of the floor cross member and the lower surface of the connecting member.

With this configuration, connecting force between the floor cross member and the rocker can be further increased. Then, it is possible to lower the floor height of the vehicle by lowering the position of the locker.

In the vehicle floor structure of the present disclosure, the connecting member may comprise a pair of connecting flanges extending toward each upper surface of the pair of upper flanges of the end portions of the floor cross member from the pair of lower flanges, and a connecting plate for connecting the ceiling plate of the lower open groove portion and the pair of connecting flanges. Here, the pair of connecting flanges are connected to each upper surface of the pair of upper flanges, the pair of lower flanges may be connected to the upper surface of the rocker.

This allows the force of the floor cross member to be transmitted to the rocker through the lower open groove and the lower flange and the connecting flange.

In the vehicle floor structure of the present disclosure, the rocker is composed of a first rocker and a second rocker provided on each side of the vehicle, respectively, and the floor cross member is composed of a first floor cross member and a second floor cross member. The first floor cross member and the second floor cross member are arranged side by side in longitudinal direction of the vehicle. Then, the first rocker, the second rocker, the first floor cross member, and the second floor cross member define a rectangular opening. The vehicle floor structure includes a floor panel covering an upper side of the opening, and a slope device disposed in the opening on the lower side of the floor panel. Further, the lower surface of the floor panel is supported by the upper flanges of each of the first floor cross member and the second floor cross member. Slope device is provided with a slope plate. Then, slope device is disposed in the opening so that slope plate enters and exits the space between the lower surface of the floor panel and the upper surface of the rocker.

With this configuration, it is possible to lower the floor height of the vehicle with a slope device.

In the vehicle floor structure of the present disclosure, the rocker comprises a first rocker and a second rocker provided on each side of the vehicle, the first rocker may be disposed at a position lower than the second rocker. Further, one end portion of the floor cross member is connected to the upper surface of the first rocker by the connecting member, the other end portion of the floor cross member may be connected to the side surface of the second rocker by the connecting member. Then, the brace member may be connected to the first locker, the one end portion of the floor cross member, and the connecting member.

With this configuration, it is possible to simplify the connecting structure between the second rocker and the floor cross member.

The present disclosure can lower the floor height of a vehicle with slope device.

DESCRIPTION OF EMBODIMENTS

Hereinafter, the vehicle floor structure 20 of the embodiment will be described with reference to the drawings. The vehicle 100 is provided with a vehicle floor structure 20. Incidentally, the arrow FR the arrow UP, the arrow LH shown in the respective figures, shows the forward direction of the vehicle 100 (traveling direction), the upward direction, the left direction, respectively. In addition, the opposite directions of the respective arrow FR, UP, LH indicate the vehicle rear direction, the downward direction, and the right direction. Hereinafter, when it is simply described using the directions of front and rear, left and right, and up and down, unless otherwise noted, it shall indicate the front and rear of longitudinal direction of the vehicle, the left and right directions of the vehicle (lateral direction of the vehicle), and the vertical direction of the vehicle, respectively.

Figure 1:
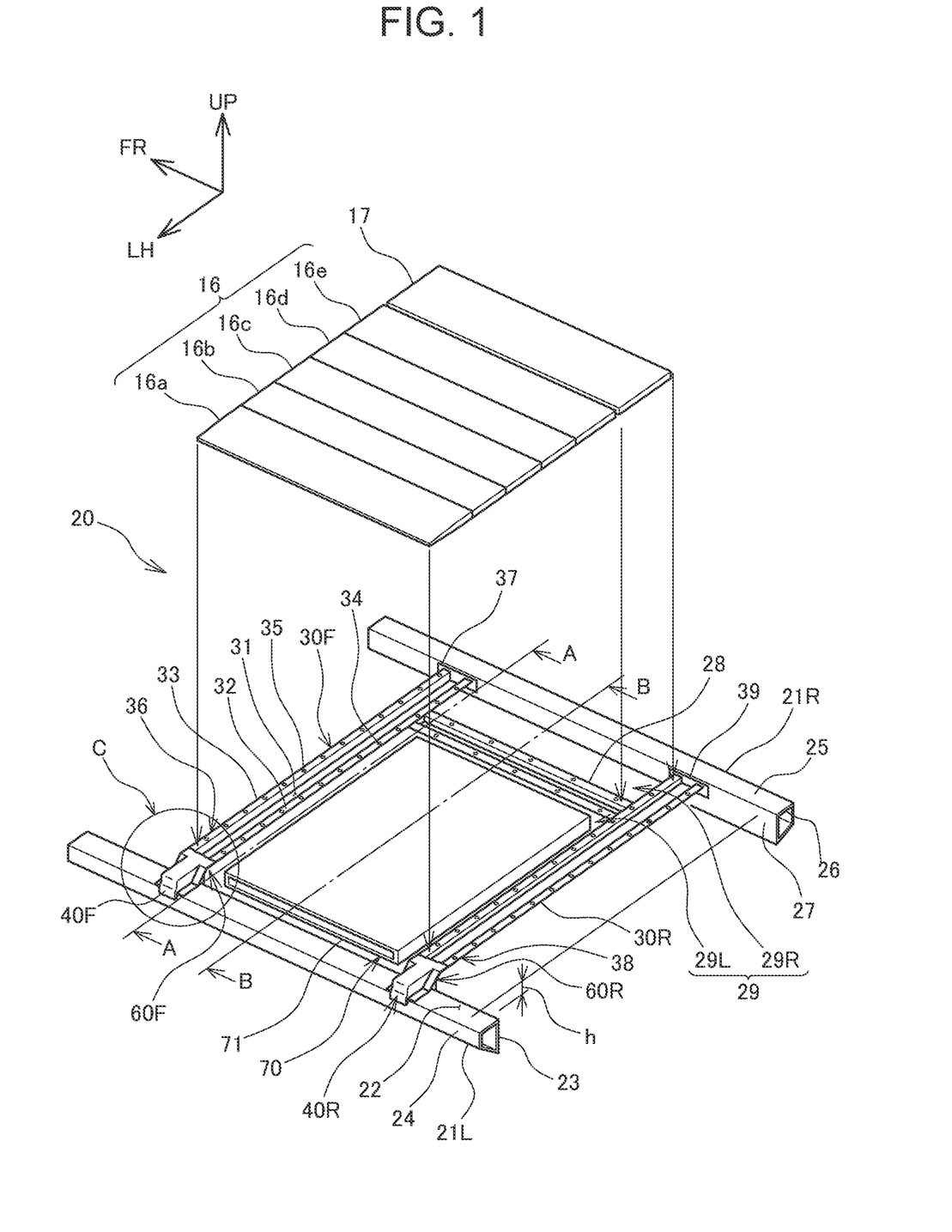
FIG. 1 is a perspective view showing a floor structure of the embodiment.

As shown in FIG. 1, the vehicle floor structure 20 includes a left rocker 21L, a right rocker 21R, a front floor cross member 30F, a rear floor cross member 30R, a front connecting member 40F, a rear connecting member 40R, a front brace member 60F, a rear brace member 60R, a left floor panel 16, a right floor panel 17, and a slope device 70. Here, the left rocker 21L and the right rocker 21R constitute a first rocker and the second rocker according to claim, respectively. Further, the front floor cross member 30F and the rear floor cross member 30R constitute the first floor cross member and the second floor cross member according to the claims, respectively.

Figure 2:
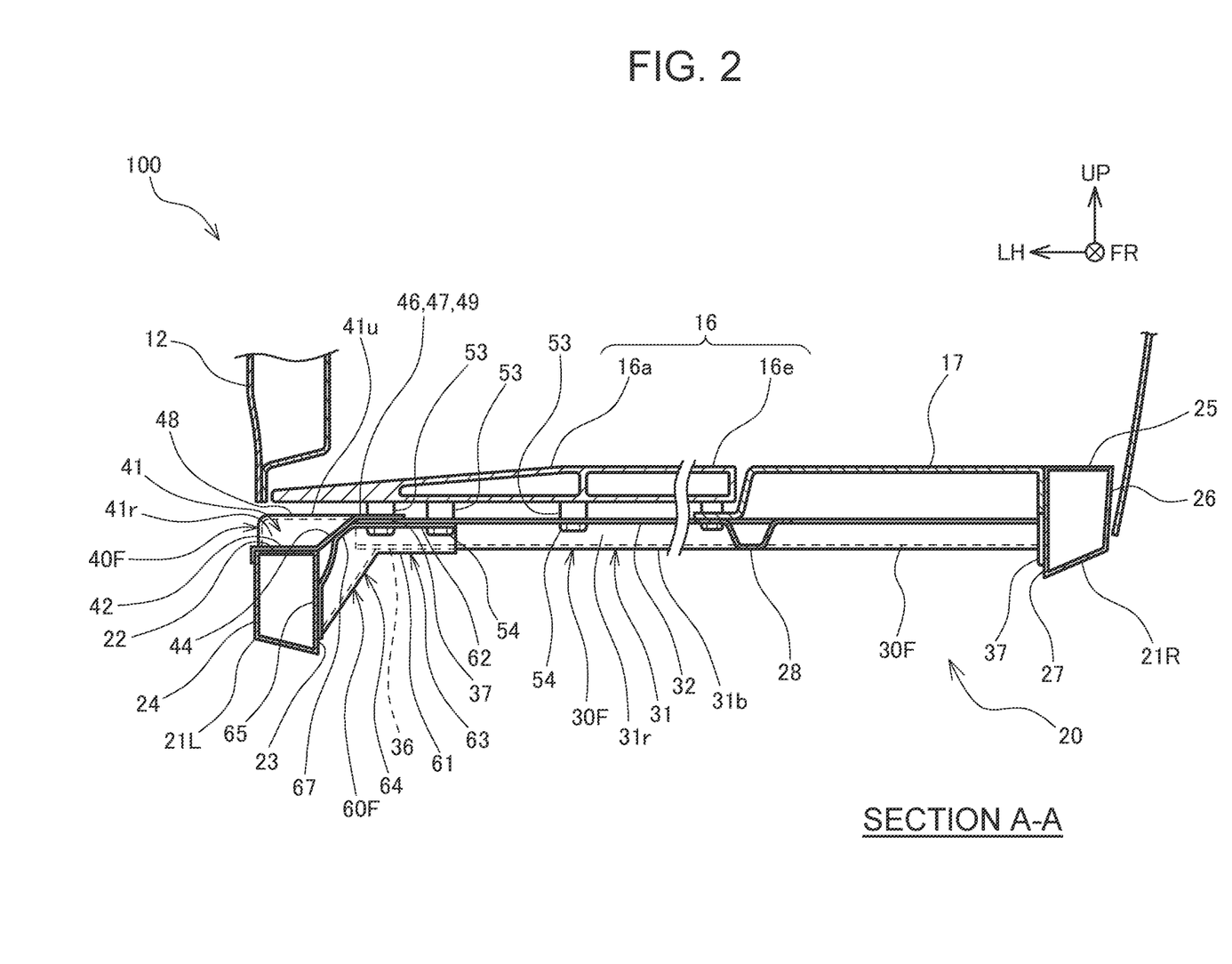
FIG. 2 is a cross-sectional view showing a floor structure of the embodiment, a A-A cross-section shown in FIG. 1.

As shown in FIGS. 1 and 2, the left rocker 21L is a rectangular closed cross-sectional structural member extending in longitudinal direction of the vehicle is disposed on the left side surface of the vehicle 100. Similarly, the right-rocker 21R is a rectangular closed cross-sectional structural member disposed on the right side of the vehicle 100 and extending to longitudinal direction of the vehicle. The left-rocker 21L includes a top surface 22, an inner side surface 23 of lateral direction of the vehicle, and an outer side surface 24 of lateral direction of the vehicle. The right-rocker 21R also includes a top surface 25, an inner side surface 27 of lateral direction of the vehicle, and an outer side surface 26 of lateral direction of the vehicle, similar to the left-rocker 21L. The left rocker 21L is positioned lower than the right rocker 21R. The upper surface 22 of the left rocker 21L is lower by a height h than the upper surface 25 of the right rocker 21R.

The front floor cross member 30F is a structural member extending to lateral direction of the vehicle. Similarly, the rear floor cross member 30R is also a structural member extending to lateral direction of the vehicle. Left end portion 36 which is one end of the front floor cross member 30F is connected to the left rocker 21L by the front connecting member 40F and the front brace member 60F. Further, the right end portion 37 is the other end is connected to lateral direction of the vehicle inner side surface 27 of the right rocker 21R. Similarly, the left end portion 38 of the rear floor cross member 30R is connected to the left rocker 21L by the rear connecting member 40R and the rear brace member 60R. Then, the right end portion 39 is connected to the inner side surface 27 of lateral direction of the vehicle of the right rocker 21R.

A rectangular opening 29 is defined between the left-rocker 21L, the right-rocker 21R, the front-floor cross member 30F, and the rear-floor cross member 30R. A floor member 28 extending to longitudinal direction of the vehicle is mounted between the front floor cross member 30F and the rear floor cross member 30R. Floor member 28 partitions the opening 29 into a left opening 29L and the right opening 29R. Left opening 29L is covered with a left floor panel 16 composed of a plurality of floor panel member 16a-16e. The right-hand opening 29R is covered by the right-hand floor panel 17. Further, a slope device 70 is disposed inside the left-opening 29L.

As shown in FIG. 2, a sliding door 12 sliding in longitudinal direction of the vehicle is provided on the left side surface of the vehicle 100. As will be described in more detail with reference to FIG. 4, a bolt 53 is attached to a hole 34 provided in the rear upper flange 32 of the front floor cross member 30F. The head of the bolt 53 has a cylindrical shape. As shown in FIG. 2, bolts 53 support the lower surface of each floor panel member 16a-16e at the top surface of the head. Thus, each floor panel member 16a-16e is supported by the rear upper flange 32 via a bolt 53.

The right floor panel 17 is also supported by the rear upper flange 32 of the front floor cross member 30F and the upper flange of the floor member 28.

Figure 3:
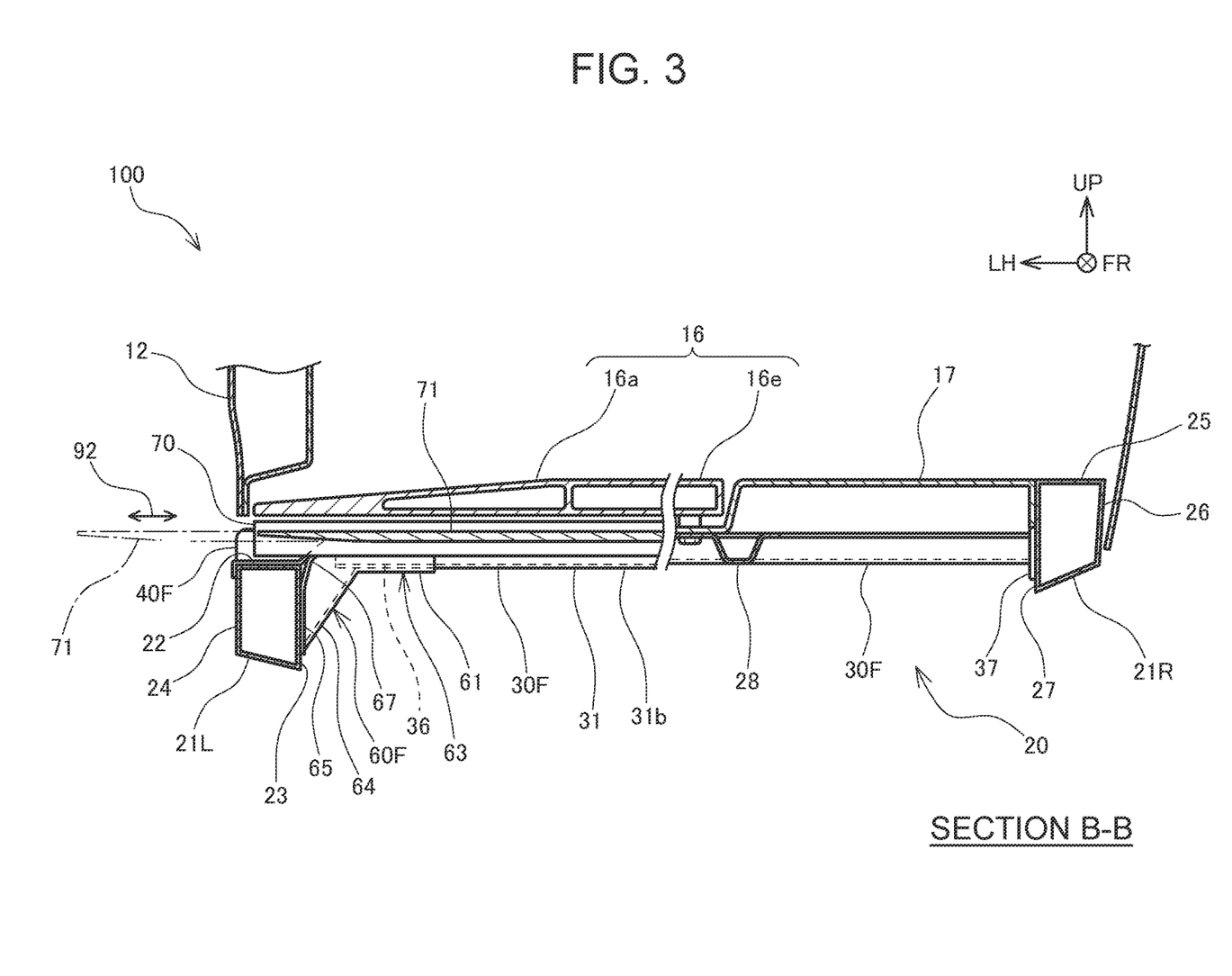
FIG. 3 is a cross-sectional view showing a floor structure of the embodiment, a B-B cross-section shown in FIG. 1.

As shown in FIG. 3, the slope device 70 is disposed between the lower surface of the left floor panel 16 and the upper surface 22 of the left rocker 21L. Then, a slope plate 71 of the slope device 70, as shown by the arrow 92 in FIG. 3, is taken in and out of lateral direction of the vehicle through the space between the lower side of the left floor panel 16 and the upper surface 22 of the left rocker 21L.

Next, a detailed structure of the front floor cross member 30F, the front connecting member 40F, and the front brace member 60F will be described.

Figure 4:
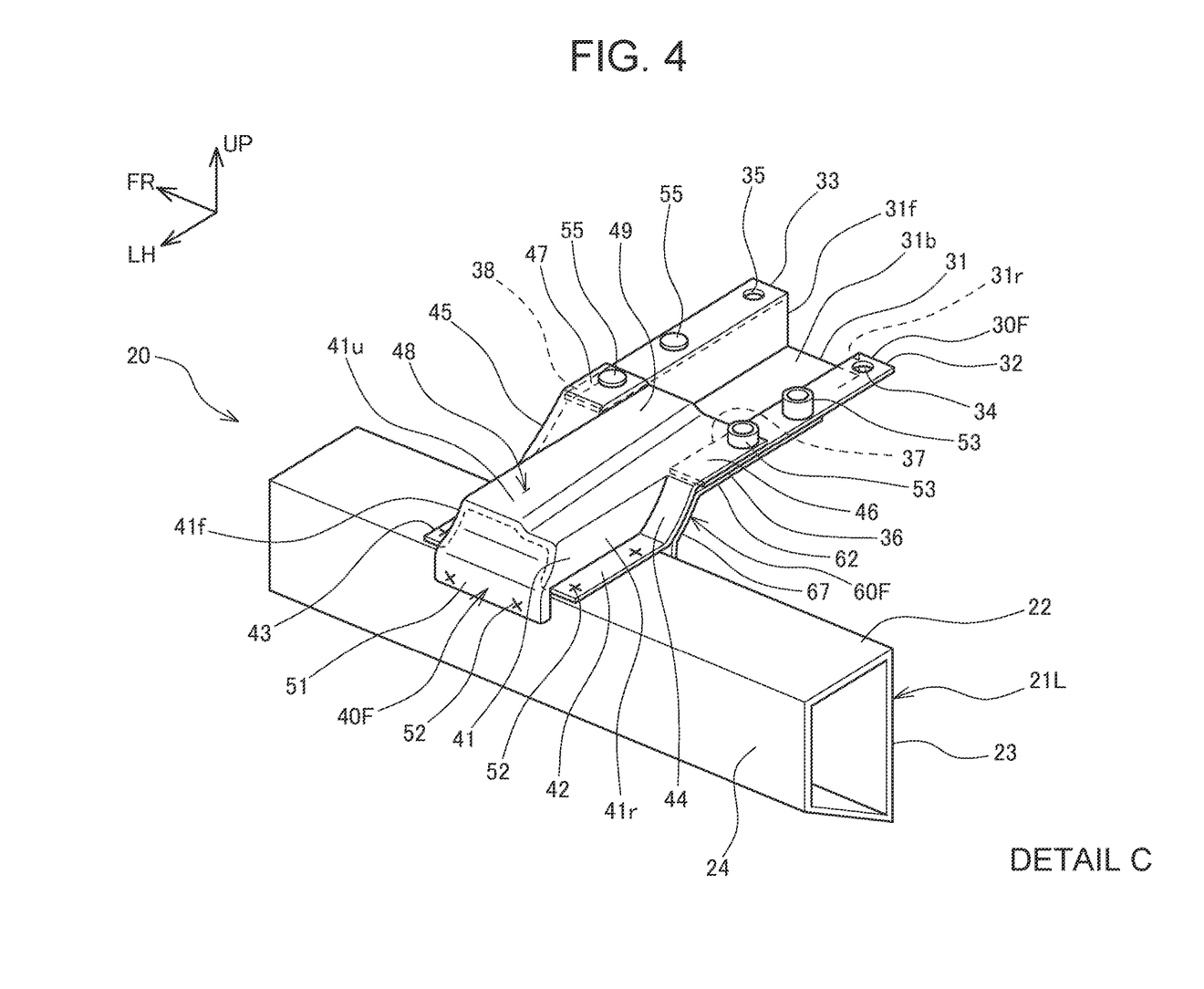
FIG. 4 is a perspective view showing a state of connecting the floor cross member and the rocker by the connecting member and the brace member, a detailed perspective view of the C portion shown in FIG. 1.

As shown in FIG. 4, the front floor cross member 30F is a member having a hat-shaped cross section comprising an upper open groove-shaped portion 31, a rear upper flange 32, and a front upper flange 33. Upper open groove 31 is a plate member having a groove shape. Front upper flange 33 is a plate member projecting from the upper end of the vehicle front side plate 31f of the upper open groove portion 31 to the vehicle front. Rear upper flange 32 is a plate member projecting from the upper end of the vehicle rear side plate 31r of the upper open groove portion 31 to the vehicle rear. The height of the vehicle front side plate 31f of the upper open groove 31 is higher than the side plate 31r of the vehicle rear. Therefore, the upper surface of the front upper flange 33 is higher than the upper surface of the rear upper flange 32. Holes 34 for inserting the bolts 53 are provided on the rear upper flange 32. Similarly, a holes 35 for inserting the bolts 55 of another shape are provided on the front upper flange 33. Each bolt 53 connects the rear upper connecting flange 46 of the front connecting member 40F to be described later, and the brace rear upper flange 62 of the front brace member 60F. Further, the bolts 55 connect the front upper connecting flange 47 of the front connecting member 40F and the brace front upper flange(not shown). Further, each head of each bolt 53 has a cylindrical shape. Each bolt 53 supports a lower surface of each floor panel member 16a-16e at each upper surface of each head.

Figure 5:
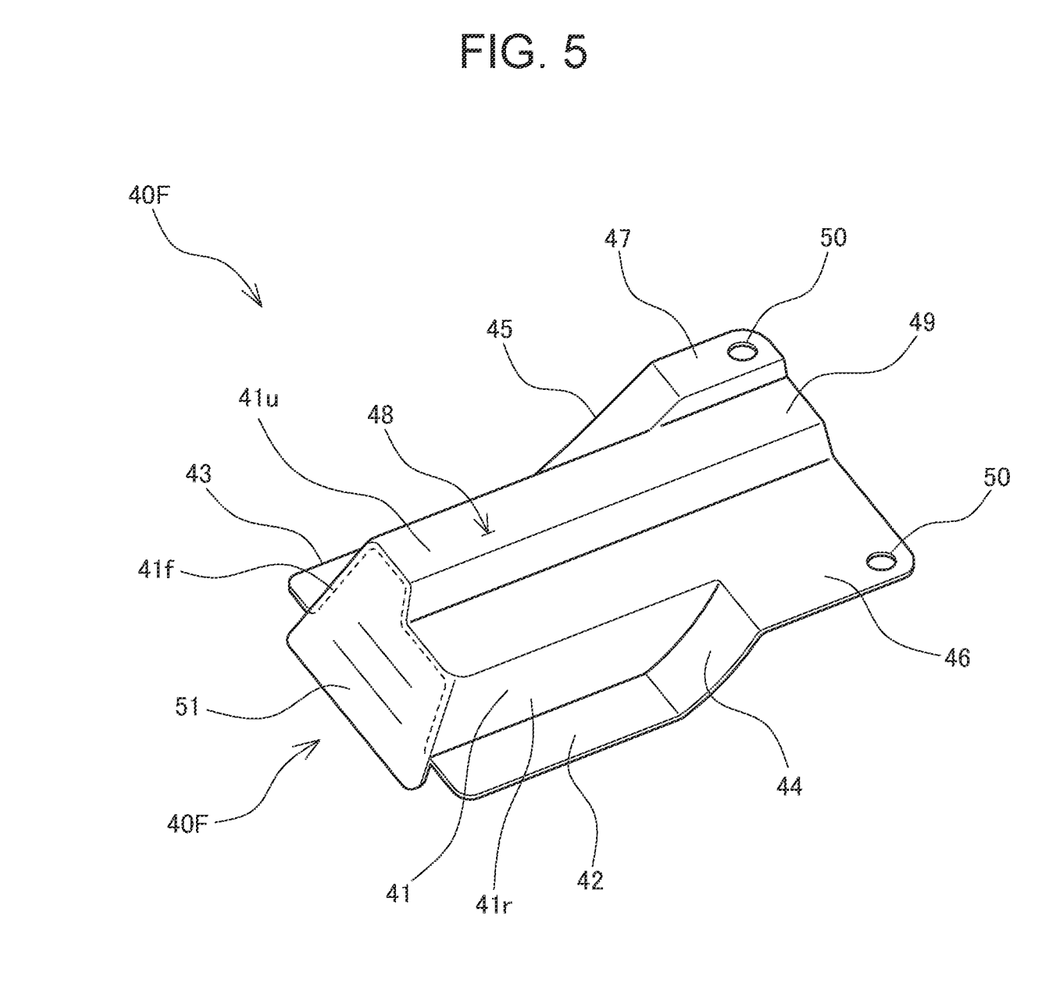
FIG. 5 is a perspective view of a connecting member of the floor structure of the embodiment.

As shown in FIGS. 4 and 5, the front connecting member 40F includes a rocker fastening portion 48, a rear inclined connecting flange 44, a front inclined connecting flange 45, a rear upper connecting flange 46, and a front upper connecting flange 47. Rear inclined connecting flange 44 and the rear upper connecting flange 46 constitute a rear connecting flange of the front connecting member 40F. Further, the front inclined connecting flange 45 and the front upper connecting flange 47 constitute a front connecting flange of the front connecting member 40F.

Locker fastening portion 48 is a member having a hat-shaped cross section comprising a lower open groove 41, a front lower flange 43, and a rear lower flange 42. Lower open groove 41 is a plate member having a groove shape. Front lower flange 43 is a plate member projecting from the lower end of the vehicle front side plate 41f of the lower open groove 41 in front of the vehicle. Rear lower flange 42 is a plate member projecting from the lower end of the vehicle rear side plate 41r of the lower open groove 41 to the vehicle rear. End plate 51 is provided on the left end surface of the lower open groove 41. Front lower flange 43 and the rear lower flange 42 are connected by spot-welding 52 to the upper surface 22 of the left rocker 21L. The lower end of the end plate 51 is connected by spot-welding 52 to the outer surface 24 of the left-rocker 21L. Incidentally, x mark in FIG. 4 indicates the position of the spot welding 52.

Rear upper connecting flange 46 is a plate-like member connected to the upper surface of the rear upper flange 32 of the front floor cross member 30F. Rear inclined connecting flange 44 is a plate-like member projecting from the side plate 41r of the lower open groove 41 to the rear of the vehicle. Rear inclined connecting flange 44 is inclined so that the right end is higher than the left end. Then, the rear inclined connecting flange 44 connects the rear lower flange 42 and the rear upper connecting flange 46. Similarly, the front upper connecting flange 47 is a plate-like member connected to the upper surface of the front upper flange 33 of the front floor cross member 30F. Further, the front inclined connecting flange 45 is a plate-like member protruding from the side plate 41f of the lower open groove 41 in front of the vehicle. Front inclined connecting flange 45 is inclined so that the right end is higher than the left end. Front inclined connecting flange 45 is connected to the front lower flange 43 and the front upper connecting flange 47. Bolt hole 50 is provided in the rear upper connecting flange 46. Bolts 53 for connecting the rear upper flange 32 and the rear upper connecting flange 46 of the front floor cross member 30F is inserted into the bolt hole 50. Similarly, the bolt hole 50 is also provided in the front upper connecting flange 47. The bolt hole 50, a bolt 55 for fastening the front upper connecting flange 47 and the front upper flange 33 is inserted. The rear upper connecting flange 46 and the front upper connecting flange 47 is connected by a connecting plate 49 to longitudinal direction of the vehicle. Connecting plate 49 is connected to the ceiling plate 41u of the lower open groove portion 41 of the rocker fastening portion 48. Incidentally, as described above, the upper surface of the front upper flange 33 of the upper open groove portion 31 of the front floor cross member 30F is higher than the upper surface of the rear upper flange 32. Therefore, the upper surface of the front upper connecting flange 47 which is connected to the upper surface of the front upper flange 33 is higher than the upper surface of the rear upper connecting flange 46 which is connected to the upper surface of the rear upper flange 32. Therefore, the ceiling plate 41u and the connecting plate 49 of the lower open groove portion 41, a step is provided between the front side and the rear side.

Figure 6:
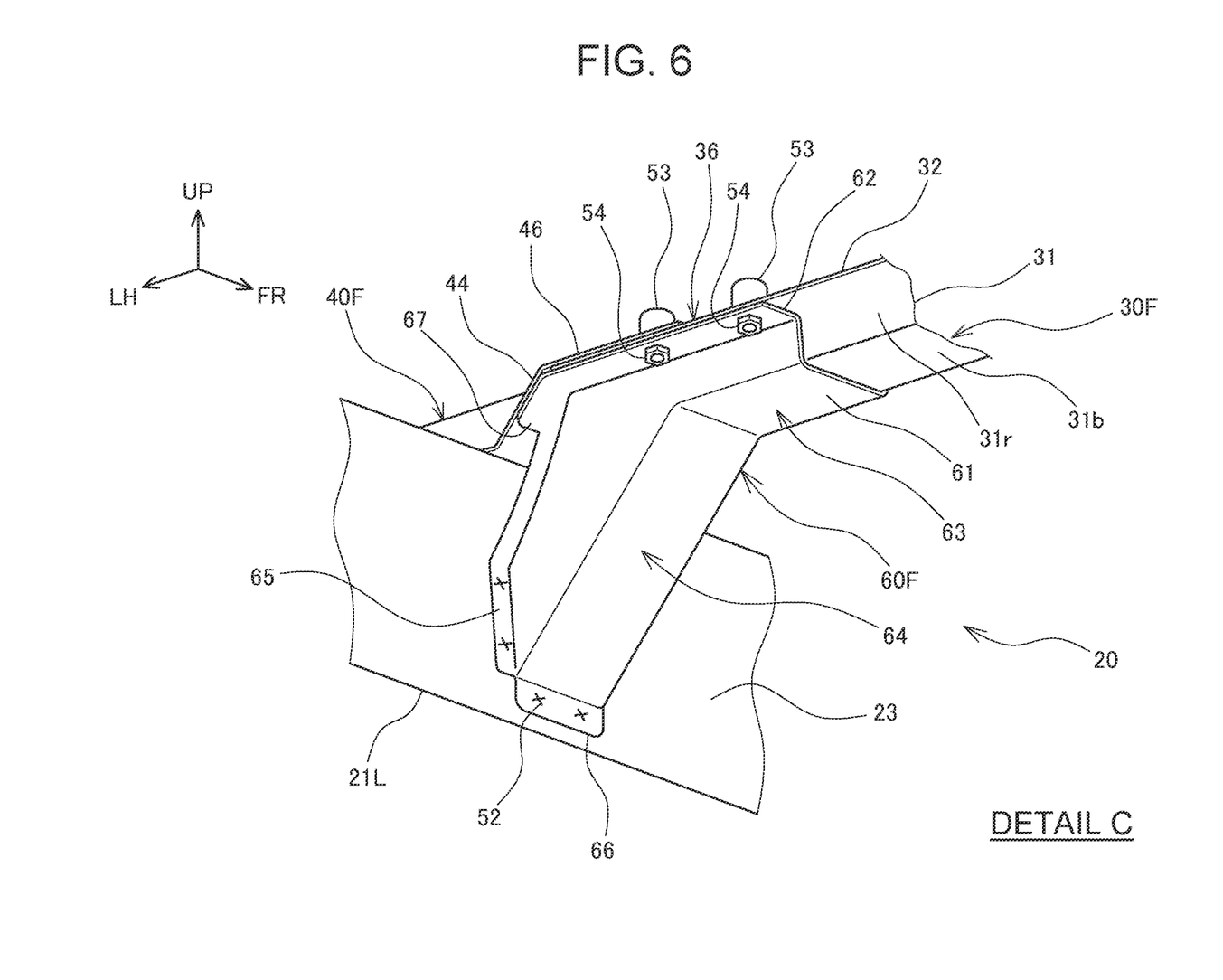
FIG. 6 is a perspective view showing a floor structure of the embodiment, a detailed perspective view of the C portion shown in FIG. 1 from the vehicle lower side.

As shown in FIG. 6, the front brace member 60F includes a support portion 63 and the locker connecting portion 64. The front brace member 60F connects the left rocker 21L, the left end portion 36 of the front floor cross member 30F, and the front connecting member 40F.

Support portion 63 includes a brace upper open groove 61, a brace rear upper flange 62, a brace front upper flange (not shown), a brace rear inclined flange 67, the brace front inclined flange (not shown). The support portion 63 has a hat-shaped cross section which is open on the upper side.

The brace upper open groove 61 has a groove shape that fits into the outer surface of the upper open groove 31 of the front floor cross member 30F, and supports the lower surface of the bottom plate 31b of the upper open groove 31. Brace rear upper flange 62 and the brace front upper flange (not shown) is connected to the lower surface of the rear upper flange 32 and the front upper flange 33 of the front floor cross member 30F, respectively. Brace rear upper flange 62 and the brace front upper flange (not shown) supports the lower surface of the rear upper flange 32 and the front upper flange 33, respectively. Brace rear inclined flange 67 extends leftward inclined along the lower surface of the rear inclined connecting flange 44 of the front connecting member 40F from the brace rear upper flange 62. Brace rear inclined flange 67 supports the lower surface of the rear inclined connecting flange 44. Similarly, the brace forward inclined flange (not shown) extends leftward inclined along the lower surface of the front inclined connecting flange 45 of the front connecting member 40F from the brace front upper flange (not shown). A brace forward inclined flange (not shown) supports the lower surface of the forward inclined connecting flange 45. Thus, the support portion 63 supports the lower surface of the left end portion 36 of the front floor cross member 30F. Further, the support portion 63 supports the lower surface of the rear inclined connecting flange 44, and the lower surface of the front inclined connecting flange 45.

Locker connecting portion 64 is a groove-shaped cross-sectional member successive to the lower side of the support portion 63, the flanges 65 and 66 are provided which are connected by spot-welding 52 to the inner side surface 23 of the left rocker 21L.

As shown in FIGS. 2, 4 and 6, the rear upper connecting flange 46 and the rear upper flange 32 and the brace rear upper flange 62 is superimposed. Then, these three plate members are fastened together with the bolt 53 and the nut 54. Further, a rear upper flange 32, the brace rear upper flange 62 is also superimposed. Then, these two plate members are also fastened together with the bolt 53 and the nut 54. Similarly, the front upper connecting flange 47 and the front upper flange 33 and the brace front upper flange (not shown) are also superimposed. Then, these three plate members are co-fastened with bolts 55 and nuts (not shown). Furthermore, the front upper flange 33 and the brace front upper flange (not shown) is also superimposed. Then, these two plate members are co-fastened with bolts 55 and nuts (not shown).

Rear lower flange 42 and the front lower flange 43 is connected to the upper surface 22 of the left rocker 21L by spot-welding 52. Further, the flanges 65 and 66 of the front frame member are connected to the side surface 23 of the left-rocker 21L by spot-welding 52. Therefore, the front connecting member 40F connects the upper surface 22 of the left rocker 21L, the rear upper flange 32 of the front floor cross member 30F, and the front upper flange 33. Further, the front brace member 60F connects the lower surface of the front floor cross member 30F, the lower surface of the front connecting member 40F, and the side surface 23 of the left rocker 21L.

With this configuration, the force applied to the rear upper flange 32 of the front floor cross member 30F is transmitted to the rear upper connecting flange 46 of the front connecting member 40F. The transmitted force then flows from the rear upper connecting flange 46 through the rear inclined connecting flange 44 to the rear lower flange 42. Similarly, the force applied to the front upper flange 33 of the front floor cross member 30F is transmitted to the front upper connecting flange 47 of the front connecting member 40F. The transmitted force then flows from the front upper connecting flange 47 through the front inclined connecting flange 45 to the front lower flange 43. Then, the force flowing through the rear lower flange 42 and the front lower flange 43 is transmitted to the upper surface 22 of the left rocker 21L through the spot weld 52. Further, the force applied to the rear upper flange 32 and the front upper flange 33 of the front floor cross member 30F is transmitted to the rear upper connecting flange 46 and the front upper connecting flange 47 of the front connecting member 40F. The transmitted force is transmitted to the rear lower flange 42 and the front lower flange 43 through the connecting plate 49 and the ceiling plate 41$u$ and the side plate 41$r$ and 41$f$. Then, the force transmitted to the rear lower flange 42 and the front lower flange 43 is transmitted from the rear lower flange 42 and the front lower flange 43 to the left rocker 21L. Further, the force transmitted to the ceiling plate 41$u$ and the side plate 41$r$, 41$f$ of the lower open groove 41 is transmitted to the outer surface 24 of the left rocker 21L through the end plate 51.

Furthermore, the force applied to the rear upper flange 32 of the front floor cross member 30F is transmitted to the brace rear upper flange 62 of the support portion 63 of the front brace member 60F. Force transmitted to the brace rear upper flange 62 is transmitted to the side surface 23 of the left rocker 21L through the flange 65, 66 of the rocker connecting portion 64. Similarly, the force applied to the front upper flange 33 of the front floor cross member 30F is transmitted to the brace front upper flange (not shown) of the support portion 63 of the front brace member 60F. Force transmitted to the brace front upper flange is transmitted through the flange 65, 66 of the rocker connecting portion 64 to the side surface 23 of the left rocker 21L. Also, a portion of the force applied to the rear upper connecting flange 46 from the rear upper flange 32 is also transmitted to the side surface 23 of the left rocker 21L through the flange 65, 66 of the rocker connecting portion 64. Similarly, a portion of the force applied to the front upper connecting flange 47 of the front connecting member 40F from the front upper flange 33 is also transmitted to the side surface 23 of the left rocker 21L through the flange 65, 66 of the rocker connecting portion 64.

Thus, a rear upper flange 32 and the front upper flange 33, and the upper surface 22 of the left rocker 21L is connected by a front connecting member 40F, it is possible to transmit a force in the left rocker 21L from the rear upper flange 32 and the front upper flange 33. Thus, even when the rear upper flange 32 and the front upper flange 33 can not be directly connected to the upper surface 22 of the left rocker 21L, it is possible to increase connecting force between the front floor cross member 30F and the left rocker 21.

Further, the front brace member 60F connects the side surface 23 of the left rocker 21L, the lower surface of the front floor cross member 30F, and the lower surface of the front connecting member 40F. This makes it possible to further increase connecting force between the front floor cross member 30F and the left-rocker 21L.

The rear floor cross member 30R has a form in which the front floor cross member 30F is inverted in the longitudinal direction. Further, the rear connecting member 40R is a shape obtained by inverting the front connecting member 40F in the longitudinal direction. Furthermore, the rear brace member 60R is a shape obtained by inverting the front brace member 60F in the longitudinal direction. Therefore, a description thereof will be omitted.

As described above, the vehicle floor structure 20 of the present embodiment can maintain a high fastening strength between the front floor cross member 30F and the left-rocker 21L. Similarly, the vehicle floor structure 20 of the present embodiment can maintain a high fastening strength between the rear floor cross member 30R and the left-rocker 21L. Then, the rocker 21L can be placed at a lower position simultaneously with these. Therefore, it is possible to place slope device 70 so as to be able to put in and out slope plate 71 through the space between the lower side of the left floor panel 16 L and the upper surface 22 of the left rocker 21. This makes it possible to lower the floor height of the vehicle 100 on which slope device 70 is mounted.

In the above description, the vehicle 100, the door 12 is provided on the left side, has been described by placing the position of the left rocker 21L lower than the right rocker 21R is not limited thereto. A door 12 may be provided on the right side, and the right rocker 21R may be made lower than the left rocker 21L, so that the front floor cross member 30F, the rear floor cross member 30R, and the right rocker member are joined by the joining member and the brace member, respectively. Further, the position of the right rocker 21R as the same lower position as the left rocker 21L, by the front connecting member 40F and the front brace member 60F, the left end portion 36 of the front floor cross member 30F may be connected to the left rocker 21L. At this time, the right end portion 37 may be connected to the right rocker 21R by the connecting member and the brace member. Similarly, using the rear connecting member 40R and the rear brace member 60R, the left end portion 38 of the rear floor cross member 30R may be connected to the left rocker 21L. At this time, the right end portion 39 may be connected to the right rocker 21R by the connecting member and the brace member.

Further, in the vehicle floor structure 20 described above, the opening 29 defined by the left rocker 21L, the right rocker 21R, the front floor cross member 30F, and the rear floor cross member 30R has been described as being partitioned by the floor member 28 into the left opening 29L and the right opening 29R, but is not limited thereto, and the floor member 28 is not provided, and slope device 70 may be disposed in the opening 29.

The invention claimed is:
1. A vehicle floor structure comprising:
a rocker having a rectangular closed cross-sectional shape disposed at a side of a vehicle and extending in a longitudinal direction of a vehicle;
a floor cross member extending in a lateral direction of the vehicle and having a hat-shaped cross section formed by an upper open groove portion and a pair of upper flanges; and
a connecting member connecting the rocker and the floor cross member,
wherein the rocker is arranged such that an upper surface of the rocker is positioned lower than the pair of upper flanges of the floor cross member, and
wherein the connecting member has a hat-shaped cross-section formed by a lower open groove portion and a pair of lower flanges, and connects the upper surface of the rocker and the pair of upper flanges of the floor cross member.

2. The vehicle floor structure according to claim 1, further comprising a brace member that connects a side surface of the rocker, a lower surface of the floor cross member, and a lower surface of the connecting member.

3. The vehicle floor structure according to claim 1, wherein
the connecting member further comprises
a pair of connecting flanges extending from the pair of lower flanges toward upper surfaces of the pair of upper flanges of an end portion of the floor cross member and fastened to the upper surfaces of the pair of upper flanges, and
a connecting plate connecting the pair of connecting flanges and a ceiling plate of the lower open groove portion, and
the pair of lower flanges are fastened to the upper surface of the rocker.

4. The vehicle floor structure according to claim 2, wherein
the connecting member further comprises
a pair of connecting flanges extending from the pair of lower flanges toward upper surfaces of the pair of upper flanges of an end portion of the floor cross member and fastened to the upper surfaces of the pair of upper flanges, and
a connecting plate connecting the pair of connecting flanges and a ceiling plate of the lower open groove portion, and
the pair of lower flanges are fastened to the upper surface of the rocker.

5. The vehicle floor structure according to claim 1, wherein
the rocker comprises a first rocker and a second rocker provided at respective sides of the vehicle, and the floor cross member comprises a first floor cross member and a second floor cross member arranged side by side in the longitudinal direction of the vehicle, and
the first and second rockers and the first and second floor cross members define a rectangular opening,
the vehicle floor structure further comprises
a floor panel covering an upper side of the opening, and
a slope device arranged in the opening on the lower side of the floor panel, the slope device comprising a slope plate, and
a lower surface of the floor panel is supported by the each upper flange of each of the first and second floor cross members,
wherein the slope device is disposed in the opening such that the slope plate is allowed to enter and exit a space between the lower surface of the floor panel and the upper surface of the rocker.

6. The vehicle floor structure according to claim 2, wherein
the rocker comprises a first rocker and a second rocker provided at respective sides of the vehicle, and the floor cross member comprises a first floor cross member and a second floor cross member arranged side by side in the longitudinal direction of the vehicle, and
the first and second rockers and the first and second floor cross members define a rectangular opening,
the vehicle floor structure further comprises
a floor panel covering an upper side of the opening, and
a slope device arranged in the opening on the lower side of the floor panel, the slope device comprising a slope plate, and
a lower surface of the floor panel is supported by the each upper flange of each of the first and second floor cross members,
wherein the slope device is disposed in the opening such that the slope plate is allowed to enter and exit a space between the lower surface of the floor panel and the upper surface of the rocker.

7. The vehicle floor structure according to claim 3, wherein
the rocker comprises a first rocker and a second rocker provided at respective sides of the vehicle, and the floor cross member comprises a first floor cross member and a second floor cross member arranged side by side in the longitudinal direction of the vehicle, and
the first and second rockers and the first and second floor cross members define a rectangular opening,
the vehicle floor structure further comprises
a floor panel covering an upper side of the opening, and
a slope device arranged in the opening on the lower side of the floor panel, the slope device comprising a slope plate, and
a lower surface of the floor panel is supported by the each upper flange of each of the first and second floor cross members,
wherein the slope device is disposed in the opening such that the slope plate is allowed to enter and exit a space between the lower surface of the floor panel and the upper surface of the rocker.

8. The vehicle floor structure according to claim 4, wherein
the rocker comprises a first rocker and a second rocker provided at respective sides of the vehicle, and the floor cross member comprises a first floor cross member and a second floor cross member arranged side by side in the longitudinal direction of the vehicle, and
the first and second rockers and the first and second floor cross members define a rectangular opening,
the vehicle floor structure further comprises
a floor panel covering an upper side of the opening, and
a slope device arranged in the opening on the lower side of the floor panel, the slope device comprising a slope plate, and
a lower surface of the floor panel is supported by the each upper flange of each of the first and second floor cross members,
wherein the slope device is disposed in the opening such that the slope plate is allowed to enter and exit a space between the lower surface of the floor panel and the upper surface of the rocker.

9. The vehicle floor structure according to claim 2, wherein
the rocker comprises a first rocker and a second rocker provided at respective sides of the vehicle, and the first rocker is disposed at a position lower than the second rocker, and
the floor cross member has one end connected to the upper surface of the first rocker by the connecting member and the other end connected to a side surface of the second rocker,
wherein the brace member connects the first rocker, the one end of the floor cross member, and the connecting member.

* * * * *